(12) United States Patent
Watanabe et al.

(10) Patent No.: US 8,122,075 B2
(45) Date of Patent: Feb. 21, 2012

(54) PSEUDORANDOM NUMBER GENERATOR AND ENCRYPTION DEVICE USING THE SAME

(75) Inventors: Dai Watanabe, Kawasaki (JP); Hirotaka Yoshida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1086 days.

(21) Appl. No.: 11/947,911

(22) Filed: Nov. 30, 2007

(65) Prior Publication Data

US 2008/0243977 A1    Oct. 2, 2008

(30) Foreign Application Priority Data

Mar. 30, 2007 (JP) ................. 2007-090214
Sep. 21, 2007 (JP) ................. 2007-245710

(51) Int. Cl.
*G06F 1/02* (2006.01)

(52) U.S. Cl. .................................... 708/250
(58) Field of Classification Search .......... 708/250
See application file for complete search history.

(56) References Cited

U.S. PATENT DOCUMENTS

| 5,566,099 | A  | * | 10/1996 | Shimada ............... 708/250 |
| 7,224,796 | B2 |   | 5/2007  | Watanabe et al. |
| 2002/0097868 | A1 |   | 7/2002  | Watanabe et al. |
| 2005/0120065 | A1 |   | 6/2005  | Dirscherl et al. |

FOREIGN PATENT DOCUMENTS

JP    3724399    9/2005

OTHER PUBLICATIONS

Announcing the Advanced Encryption Standard (AES), Nov. 26, 2001, Federal Information Processing Standards Publication 197.

* cited by examiner

*Primary Examiner* — Tan V Mai
(74) *Attorney, Agent, or Firm* — Antonelli, Terry, Stout & Kraus, LLP.

(57) ABSTRACT

A pseudorandom number generator reduced in size while maintaining high security is disclosed. The generator has a state storage unit of 2 blocks (n bits per block) and a buffer of plurality of blocks, and mixes their contents to obtain a random number sequence. The mixing is done by a nonlinear transformation unit for inputting the stored content of the buffer to output data of the same size as the input data, a first linear transformation unit for inputting the content of the state storage unit and the output of the nonlinear transformation unit to store an output into the state storage unit, and a second linear transformation unit for inputting the stored content of the buffer and the stored content of the state storage unit to store an output into the buffer. The mixed content of the state storage unit is output as a random number sequence.

12 Claims, 12 Drawing Sheets

PSEUDORANDOM NUMBER GENERATOR AND ENCRYPTION DEVICE USING THE SAME

INCORPORATION BY REFERENCE

This application claims priority based on Japanese patent applications, Nos. 2007-090214 filed on Mar. 30, 2007 and 2007-245710 filed on Sep. 21, 2007, the entire contents of which are incorporated herein by reference.

BACKGROUND OF THE INVENTION

The present invention relates to a device for generating a practical random number sequence and its application device.

Random numbers are highly necessary for such purposes as signature generation using public key encryption technology, key generation for performing secret communication, and stream cipher technology.

However, it is unrealistic to try to use true random numbers in such purposes, and pseudorandom numbers (hereinafter simply referred to as random numbers), which are generated by a pseudorandom number generating method or by a device using the method, are practically used.

When used for encryption, the pseudorandom number is necessary to meet the requirement of properties related to security. More specifically, the pseudorandom number is unpredictable and the initial value for determining the random number could not be derived from the generated random number. Further, in order to practically use the pseudorandom number generating method or generator, high speed processing is necessary in the software or hardware implementation. It is also necessary to achieve efficiency from the point of view of implementation cost. That is, the number of necessary gates is small for hardware implementation, and the number of steps and the necessary memory area are small for software implementation.

Preferably, a general purpose encryption algorithm meets all such criteria at a high level.

An example of the pseudorandom number generation technology, which can be implemented in either a software platform or a hardware platform, is described in Patent document 1 (U.S. Pat. No. 7,224,796). The pseudorandom number generation technology described in Patent document 1 achieves efficient processing and high security in the software implementation, by a large-scale high-density substitution configured with a combination of a small nonlinear substitution and a maximum distance separable code defined over finite field.

SUMMARY OF THE INVENTION

The pseudorandom number generation technology described in Patent document 1 has a large inner state to achieve high security, and has a large circuit scale in the hardware implementation. Further, a large amount of memory is necessary to implement the large-scale high-density substitution by software. For this reason, the downsizing is limited in the implementation of the pseudorandom number generation method described in Patent document 1.

Thus, it is desired to develop a pseudorandom number generation technology that makes it possible to implement with a smaller circuit scale and a smaller amount of memory, which is suitable for small electronic devices.

An aspect of the present invention is as follows. That is, a pseudorandom number generator has a state storage unit of a capacity of two blocks (one block is n bits) and a buffer of a capacity of a plurality of blocks, and obtains a random number sequence by mixing the contents of the state storage unit and the buffer.

The mixing is done by a nonlinear transformation unit for inputting stored content of the buffer in response to a clock input, and outputting data of the same size as the input data; a first linear transformation unit for inputting content of the state storage unit as well as the output of the nonlinear transformation unit, and storing an output into the state storage unit; and a second linear transformation unit for inputting the stored content of the buffer as well as the stored content of the state storage unit in response to the clock input, and storing an output into the buffer. The mixed content of the state storage unit is output as a random number sequence.

The pseudorandom number generator according to the present invention is realized by having an initialization unit for inputting a secret key of n(K) bits to determine an initial state of the buffer. Preferably, the buffer has a capacity of at least two times the capacity of n(K) bits.

The pseudorandom number generator according to the present invention is applied to an encryption/decryption device for encrypting and/or decrypting a data sequence by use of a random number sequence which is the output of the pseudorandom number generator. Further, it is also applicable to a data distribution system in which the encryption/decryption device is applied to a server and a terminal.

According to the present invention, it is possible to reduce the linear transformation, and thus to provide a pseudorandom number generator reduced in size as a whole.

These and other benefits are described throughout the present specification. A further understanding of the nature and advantages of the invention may be realized by reference to the remaining portions of the specification and the attached drawings.

DETAILED DESCRIPTION OF THE EMBODIMENT

Description of Terms

Pseudorandom number generator: a device for generating a pseudorandom number sequence by giving an initial value for determining the random number sequence.

Pseudorandom number: a finite or infinite bit sequence that is indistinguishable from a true random number by any method.

True random number: an infinite bit sequence, the next bit of which is unpredictable even if an arbitrary consecutive partial sequence is given.

Symmetric-key encryption: encryption technology using the same key for encryption and decryption.

Key: a secret parameter used for encryption.

Plaintext: data before encryption or after decryption, including digitized multimedia data.

Ciphertext: encrypted data.

Block encryption: encryption technology for performing encryption or decryption, by dividing input data at a predetermined length of data (the divided data of predetermined length is referred to as a block) and by mixing the data together with the key.

Stream encryption: encryption technology for generating a ciphertext by generating a random number sequence in the pseudorandom number generator provided with information for determining the random number sequence, and by mixing the random number sequence and the plaintext.

Nonlinear transformation: a function of the state update functions, which is not a linear transformation.

S-box: a substitution table of about three to ten bits. The S-box is often used for the implementation of ciphers, because it makes it possible to perform a transformation with high nonlinear and mixing properties by referring to the table and can be realized with a simple configuration.

Embodiment

Hereinafter, an embodiment of the present invention will be described with reference to accompanying drawings.

Figure 1:
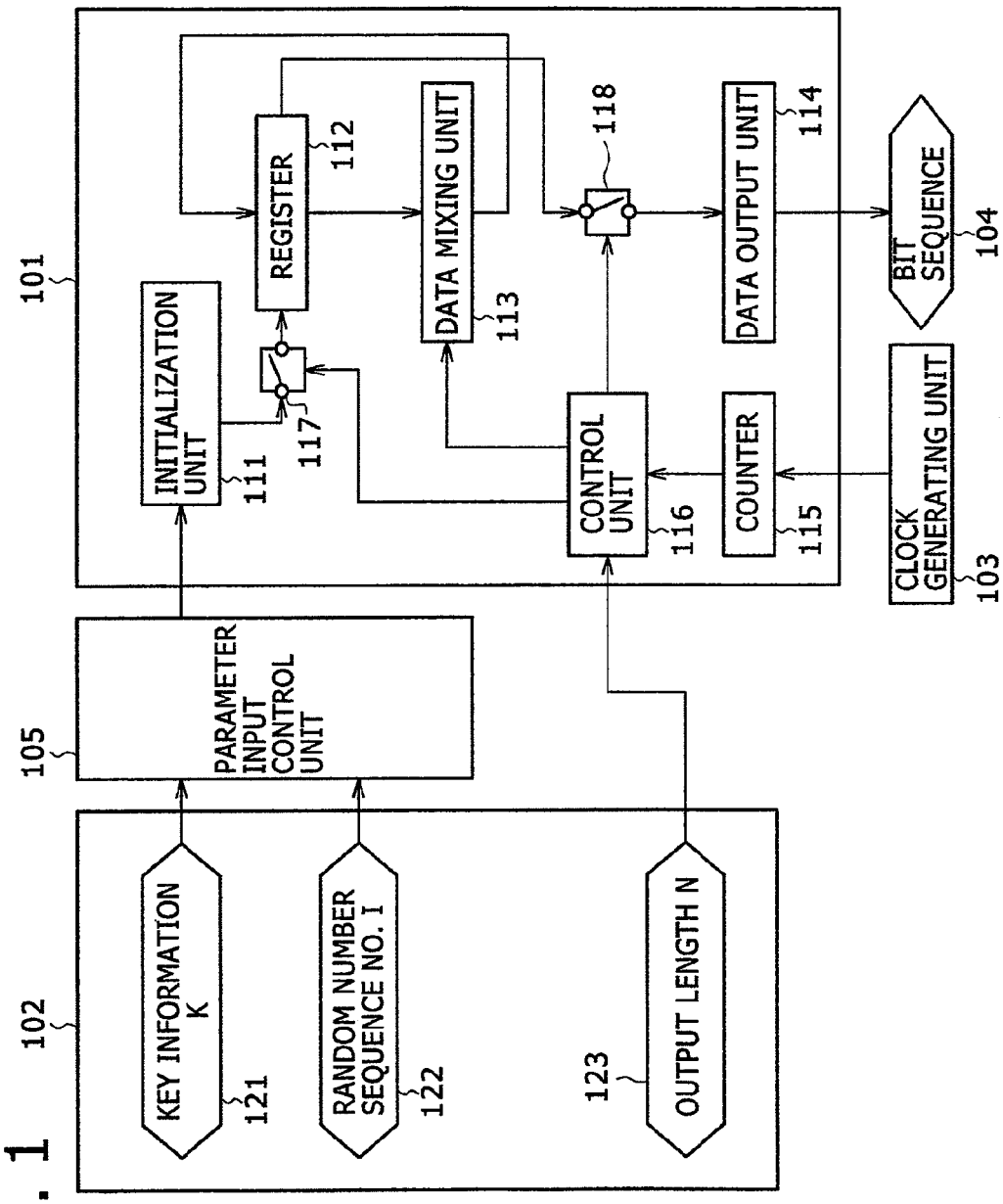
FIG. 1 is a schematic diagram showing a configuration of a pseudorandom number generator.

FIG. 1 is a schematic diagram showing a functional configuration of a pseudorandom number generator (pseudorandom number generating unit) in the embodiment. The configuration of the pseudorandom number generator will be described below with reference to FIG. 1.

A pseudorandom number generator (101) receives input data (102), as an external input, including key information (121) and a random number sequence number (122) through a parameter input control unit (105), in addition to an output length (123). The parameter input control unit (105) checks whether the input is invalid, and then inputs the key information (121) and the random number sequence number (122) into an initialization unit (111). The output length (123) is input to a control unit (116). For example, when the input key information (121) and random number sequence number (122) are too large or invalid, the parameter input control unit (105) ends the process without inputting these parameters into the pseudorandom number generator (101). The input is the values input by a user of the pseudorandom number generator (101) or by a system for calling the pseudorandom number generator (101) from the upper level. The pseudorandom number generator (101) also receives a clock signal that controls the timing for operating a circuit, from a clock generating unit (103). With such information as the input, the pseudorandom number generator (101) outputs a bit sequence (104) of an arbitrary length.

The pseudorandom number generator (101) includes the initialization unit (111), a register (112), a data mixing unit (113), a data output unit (114), a counter (115), the control unit (116), a switch (117) for controlling the input from the initialization unit (111) to the register (112), and a switch (118) for controlling the input to the data output unit (114).

The control unit (116) switches connection/disconnection of the switches (117), (118). The control unit (116) receives a signal from the clock generating unit (103) through the counter (115) operating as a step counter. Then, the control unit (116) connects the switch (118), and inputs a value held by the register (112) into the data output unit (114). The data output unit (114) outputs the bit sequence (104) from the given input. Further, upon reception of the clock signal, the control unit (116) operates the data mixing unit (113) to update the value of the register (112).

The above configuration can be realized by hardware, software, or a combination of hardware and software.

Figure 2:
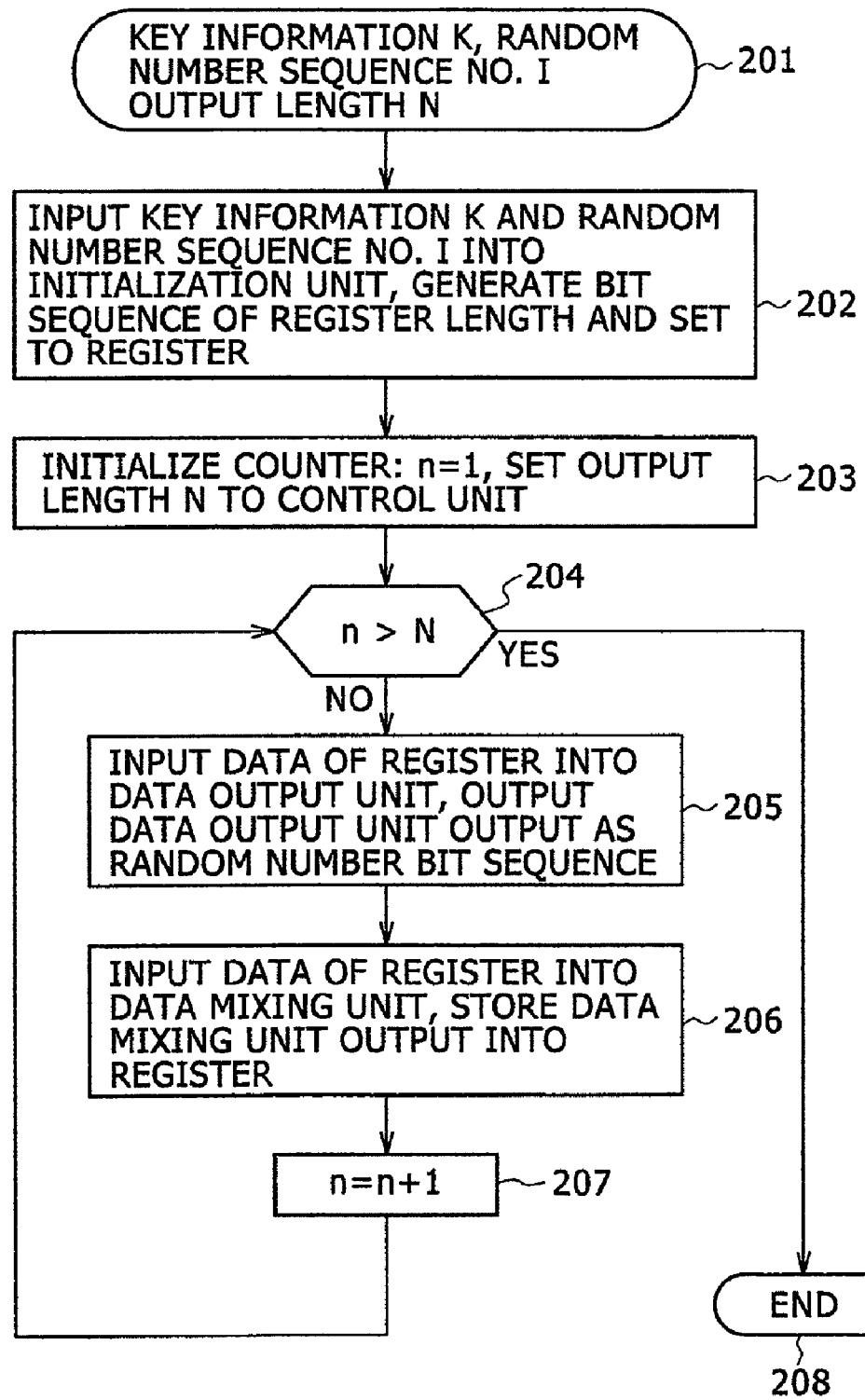
FIG. 2 is a flowchart showing a process procedure of the pseudorandom number generator.

FIG. 2 is a flowchart showing a process procedure of the pseudorandom number generator (101) shown in FIG. 1. The process procedure of the pseudorandom number generator in the embodiment will be described below with reference to FIG. 2.

Step 1 (202): The pseudorandom number generator (101) receives the key information K(112) and the random number sequence number I(122) through the parameter input control unit (105), and inputs the parameters into the initialization unit (111). The initialization unit (111) generates a bit sequence of a register length as the initial state of the register (112). The control unit (116) switches the switch (117) to a connection state, and sets the bit sequence generated by the initialization unit (111) into the register (112). When the value is set in the register (112), the control unit (116) disconnects the switch (117).

Step 2 (203): The pseudorandom number generator (101) sets the value of the counter (115) to 1. The generator also sets the output length N into the control unit (116).

Step 3 (204, 208): The pseudorandom number generator (101) receives a signal from the clock generating unit (103), and repeats the following steps when the value of the counter (115) is equal to or less than N. The pseudorandom number generator (101) ends the process when the value of the counter (115) is more than N.

Step 4 (205): The pseudorandom number generator (101) switches the switch (118) to the connection state, and inputs the value of the register (112) into the data output unit (114). The data output unit (114) receives the input, and outputs the bit sequence (104) of a predetermined length.

Step 5 (206): The data mixing unit (113) performs data mixing with the value of the register (112) as an input. The output of the data mixing unit (113) is stored again in the register (112).

Step 6 (207): The value of the counter (115) is incremented.

Figure 3:
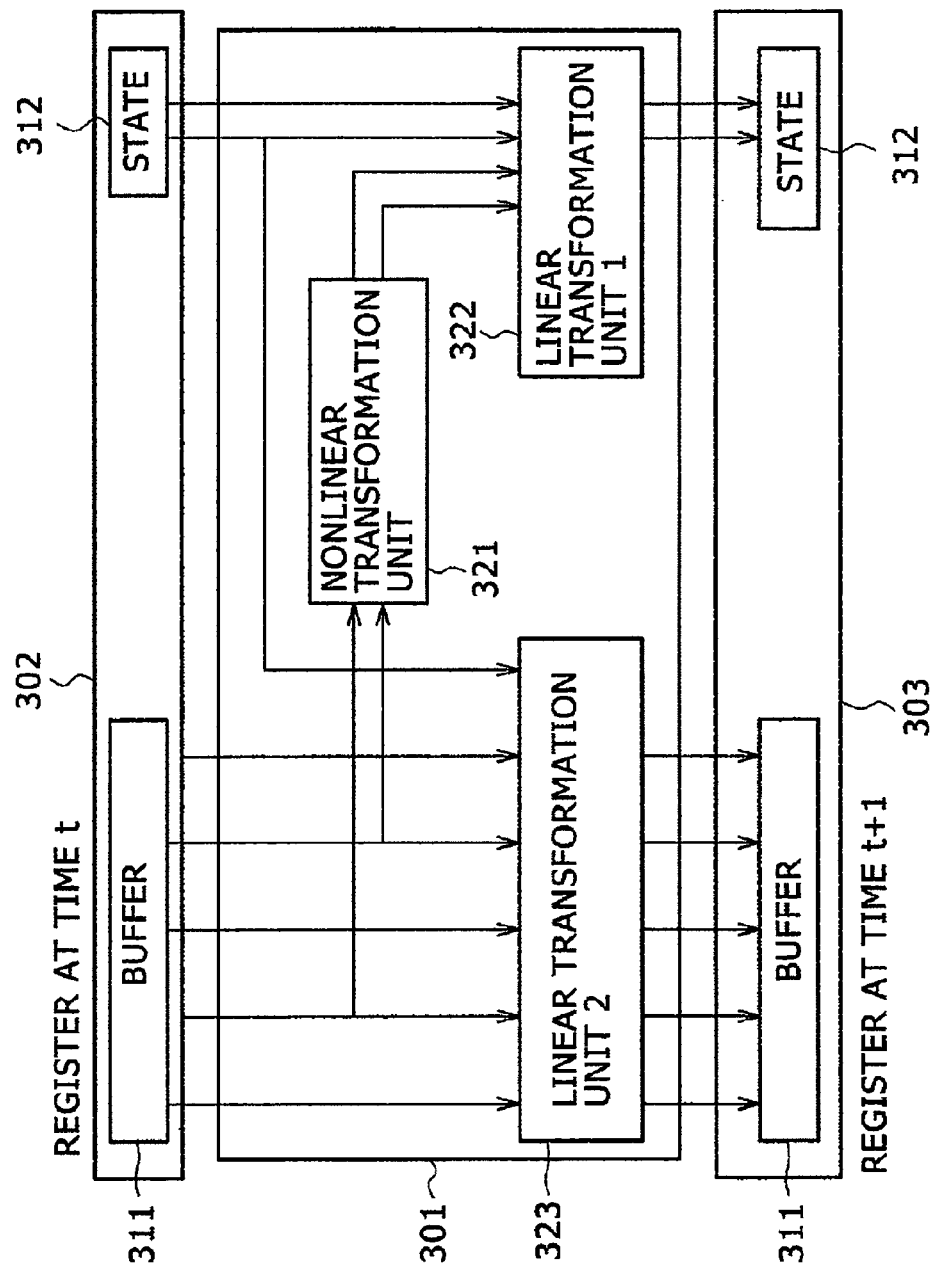
FIG. 3 is a schematic diagram showing a configuration of a data mixing unit of the pseudorandom number generator.

FIG. 3 is a schematic diagram showing a configuration of the data mixing unit (113) of the pseudorandom number generator (101) in the embodiment.

As a matter of convenience, FIG. 3 shows the register (112) separated into a register (302) at time t and a register (303) at time t+1. A data mixing unit (301) generates a state of the register (303) at time t+1 from a state of the register (302) at time t. The register (112) in the embodiment includes two small registers. In the figure, the two small registers are denoted by a buffer (311) and a state (312). The state (312) contains two words. Here, one word represents the size of the data block which is a multiple of four bits. Examples of the typically used word unit are 4 bits, 1 byte (8 bits), 2 bytes, and 4 bytes. Assuming that the size of the key information K(121) is n(K) bits, the buffer (311) may have 2×n(K) bits or more. The buffer (311) is assumed to contain M words. In the embodiment below, the parameter value is determined in the assumption that 1 word is 1 byte and n(K)=80. At this time, the buffer (311) contains 20 words.

Hereinafter, a description will be given of a configuration example of the pseudorandom number generator according to the embodiment in the assumption that one word is 1 byte and M=20. The values of the buffer (311) are denoted by B(0), B(1), and B(19) sequentially from the upper word. Similarly, the values of the state (312) are denoted by A(0), A(1) from the upper word.

The data mixing unit (301) includes a nonlinear transformation unit (321), a linear transformation unit 1(322), and a linear transformation unit 2(323). The nonlinear transformation unit (321) has an input of a partial value of the buffer (311), and inputs the output into the linear transformation unit 1(322). The linear transformation unit (322) is a function for updating the state of the state (312). The linear transformation unit (322) has an input of the output of the nonlinear transformation unit (321), and generates a value of the state at time t+1. The linear transformation unit 2(323) is a function for updating the state of the buffer (311). The linear transformation unit 2(323) has an input of the value of the buffer at time t and a partial value of the state, and generates a value of the buffer at time t+1.

Figure 4:
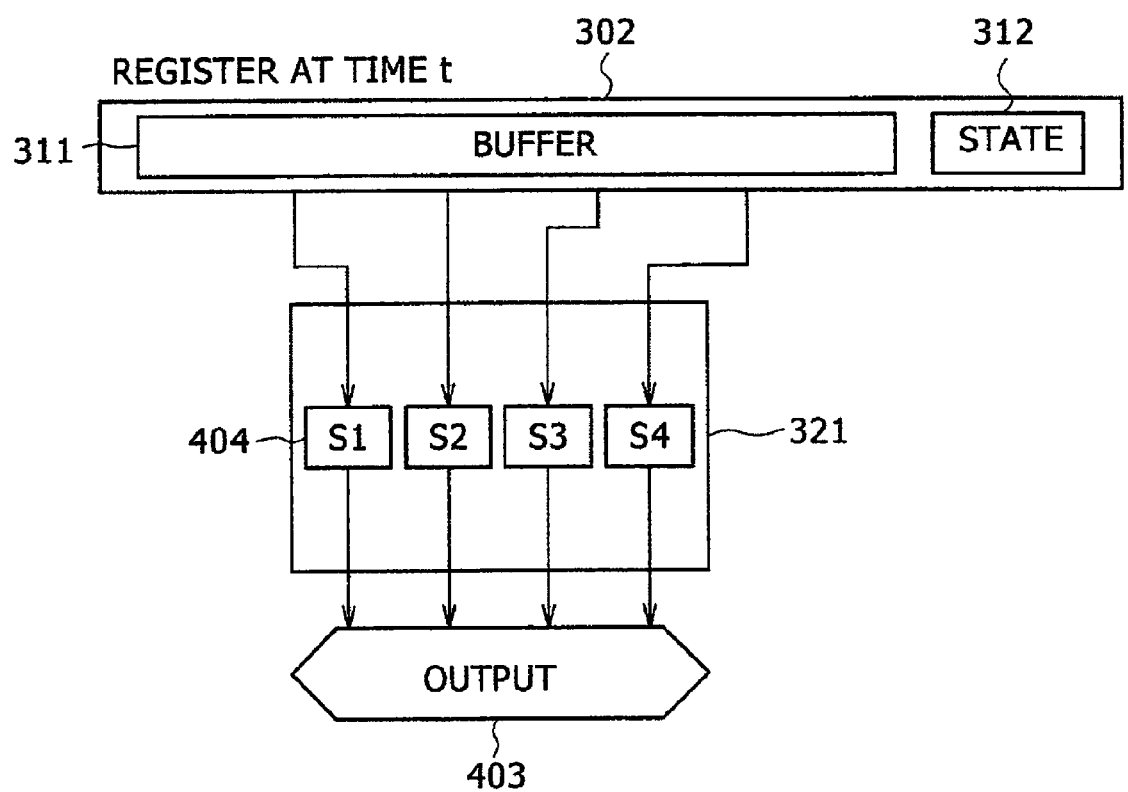
FIG. 4 is a schematic diagram showing a nonlinear transformation unit of the pseudorandom number generator.

FIG. 4 is a schematic diagram showing a configuration of the nonlinear transformation unit (321) in the data mixing unit (301) in the embodiment.

Of the content in the register (302), the nonlinear transformation unit (321) inputs four words from the buffer (311) of the register (302) at time t, and then outputs four words. The four words retrieved from the buffer (311) are denoted by B(i1), B(i2), B(i3), and B(i4) (i1<i2<i3<i4). In the embodiment, the positions of the retrieved words are determined so that the values of i2−i1, i3−i2, i4−i3, i4−i1 are different from each other. With such values, the state update function can perform the mixing at a higher level. Here, for example, the above values are i1=2, i2=5, i3=9, i4=17. At this time, i2−i1=3, i3−i2=4, i4−i3=8, i4−i1=15. As another example, i1=1, i2=4, i3=6, i4=16 may be taken as the values of i1 to i4.

Upon reception of the input of the four words, the nonlinear transformation unit (321) transforms each of the words by a small nonlinear transformation unit (404), concatenates the values to be output, and outputs the concatenated value. An example of the small nonlinear transformation unit (404) used here is an S-box substitution table of 8-bit input and 8-bit output. For example, as the S-box, it is possible to use the following substitution table used in Federal Information Processing Standards Publications (FIPS PUBS), Advanced Encryption Standard (AES), NIST, Nov. 26, 2001, P. 16, on the Internet <http://csrc.nist.gov/publications/fips/fips197/fips-197.pd f>.

Figure 12:
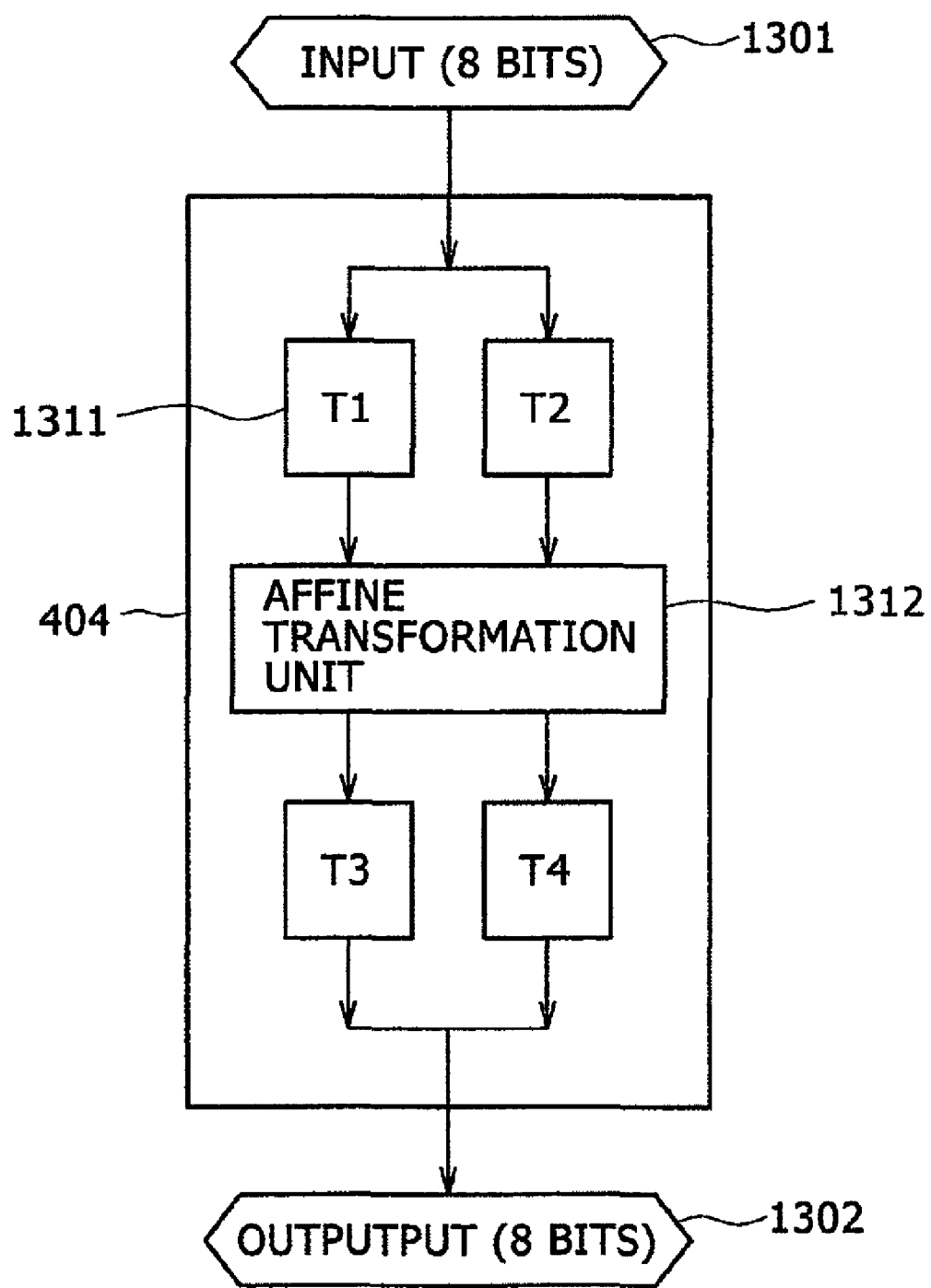
FIG. 12 is a schematic diagram showing a configuration of a small nonlinear substitution of the pseudorandom number generator.

S[256]={82, 9, 106, 213, 48, 54, 165, 56, 191, 64, 163, 158, 129, 243, 215, 251, 124, 227, 57, 130, 155, 47, 255, 135, 52, 142, 67, 68, 196, 222, 233, 203, 84, 123, 148, 50, 166, 194, 35, 61, 238, 76, 149, 11, 66, 250, 195, 78, 8, 46, 161, 102, 40, 217, 36, 178, 118, 91, 162, 73, 109, 139, 209, 37, 114, 248, 246, 100, 134, 104, 152, 22, 212, 164, 92, 204, 93, 101, 182, 146, 108, 112, 72, 80, 253, 237, 185, 218, 94, 21, 70, 87, 167, 141, 157, 132, 144, 216, 171, 0, 140, 188, 211, 10, 247, 228, 88, 5, 184, 179, 69, 6, 208, 44, 30, 143, 202, 63, 15, 2, 193, 175, 189, 3, 1, 19, 138, 107, 58, 145, 17, 65, 79, 103, 220, 234, 151, 242, 207, 206, 240, 180, 230, 115, 150, 172, 116, 34, 231, 173, 53, 133, 226, 249, 55, 232, 28, 117, 223, 110, 71, 241, 26, 113, 29, 41, 197, 137, 111, 183, 98, 14, 170, 24, 190, 27, 252, 86, 62, 75, 198, 210, 121, 32, 154, 219, 192, 254, 120, 205, 90, 244, 31, 221, 168, 51, 136, 7, 199, 49, 177, 18, 16, 89, 39, 128, 236, 95, 96, 81, 127, 169, 25, 181, 74, 13, 45, 229, 122, 159, 147, 201, 156, 239, 160, 224, 59, 77, 174, 42, 245, 176, 200, 235, 187, 60, 131, 83, 153, 97, 23, 43, 4, 126, 186, 119, 214, 38, 225, 105, 20, 99, 85, 33, 12, 125};

Alternatively, an S-box S of 8-bit input and 8-bit output may be configured from an S-box T of 4-bit input and 4-bit output to serve as the small nonlinear substitution (404). FIG. 12 is a schematic diagram showing a configuration of the S-box S of 8-bit input and 8-bit output, using the S-box T of 4-bit input and 4-bit output in the embodiment. An input (1301) to the small nonlinear substitution (404) is denoted by E, and an output (1302) therefrom is denoted by F. In the configuration of FIG. 12, the input (1301) is first divided into upper 4 bits and lower 4 bits. Assuming that the upper 4 bits is denoted by E1 and the lower 4 bits is denoted by E2, the following substitution is made:

E1||E2←E
EA1←T1[E1],
EA2←T2[E2],
EA←<EA1||EA2,
EB←L(EA),
EB1||EB2←EB,
EC1←T3[EB1],
EC2←T3[EB2],
F←EC1||EC2

Here, x||y represents the concatenation of x and y, L represents the transformation of an affine transformation unit (1312), and T1 to T4 each indicate the S-box of 4-bit input and 4-bit output. The same S-box may be used for T1 to T4. As the S-box of 4-bit input and 4-bit output, for example, it is possible to use a substitution table defined as follows: T[16]={1, 3, 9, 10, 5, 14, 7, 2, 13, 0, 12, 15, 4, 8, 6, 11}

The output of the nonlinear transformation unit X1, X2, X3, X4 can be configured as shown in the following equations, respectively, using the S-box S of 8-bit input and 8-bit output:

X1←S(B(i1)),
X2←S(B(i2)),
X3←S(B(i3)),
X4←S(B(i4))

Figure 5:
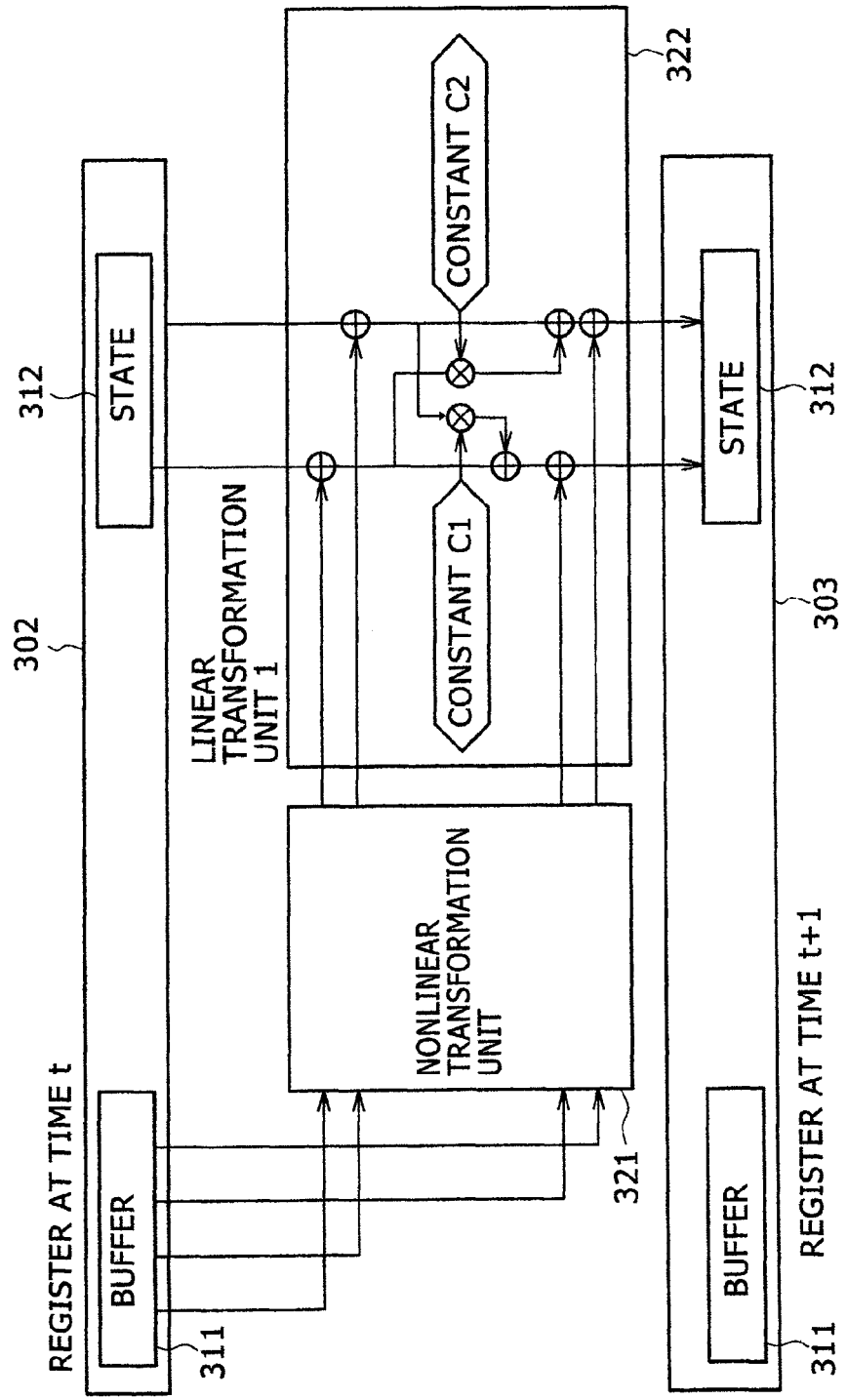
FIG. 5 is a schematic diagram showing a configuration of a state transformation unit of the pseudorandom number generator.

FIG. 5 is a schematic diagram showing a configuration of the state transformation unit (the transformation from the state (312) at time t to the state (312) at time t+1 shown in FIG. 3) of the pseudorandom number generator (101) in the embodiment.

The state transformation unit is the combination of the nonlinear transformation unit (321) and the linear transformation unit 1(322). The linear transformation unit 1(322) has the output of the nonlinear transformation unit (321) as an auxiliary input and has the value of the state (312) at time t as an input, and then outputs the value of the state at time t+1. Assuming that the outputs of the nonlinear transformation unit 321 are denoted by X1, X2, X3, X4, the linear transformation unit 1(322) performs the following process:

P(0)←A(0) XOR X1,

P(1)←A(1) XOR X2,
Q(0)←P(0) XOR C1·P(1),
Q(1)←P(1) XOR C2·P(0),
R(0)←Q(0) XOR X3,
R(1)←Q(1) XOR X4

Here, Cj·P(i) represents the multiplication defined over finite field containing $2^{n(W)}$ primitive elements, where one word is n(W) bits. The constants C1, C2 used here are values other than 0 and 1. The final results of the process, R(0) and R(1), are set to the states A(0) and A(1) at time t+1, respectively.

By performing such a linear transformation, it is possible to maximize the performance of the nonlinear transformation unit (321) in the mixing process.

Figure 6:
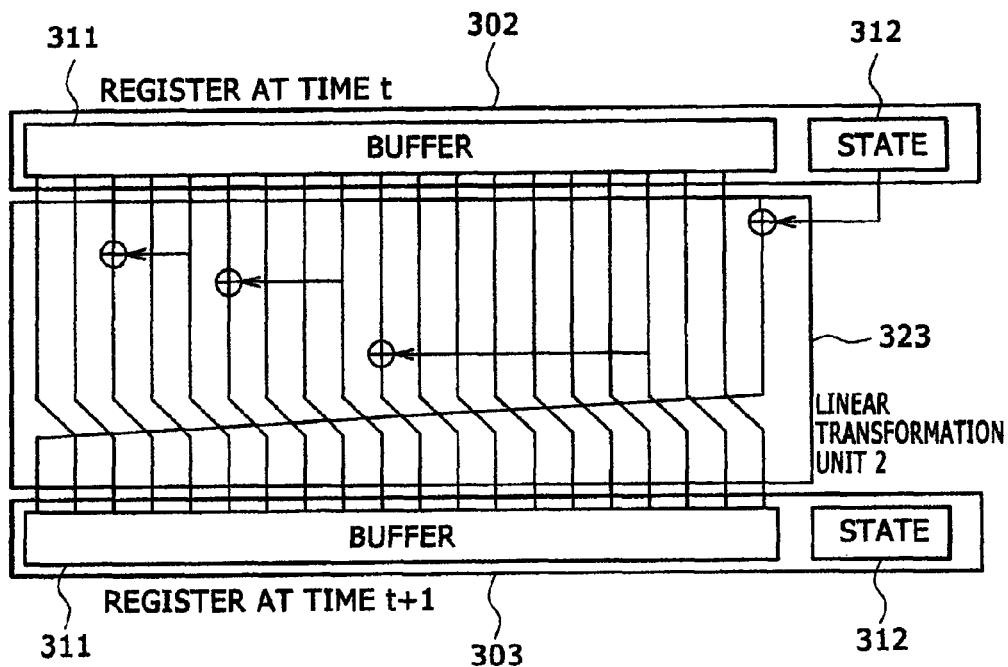
FIG. 6 is a schematic diagram showing a configuration of a buffer transformation unit of the pseudorandom number generator.

FIG. 6 is a schematic diagram of the linear transformation unit 2(323), showing a configuration of the buffer transformation unit (the transformation from the buffer (311) at time t to the buffer (311) at time t+1 shown in FIG. 3) of the pseudorandom number generator (101) in the embodiment.

The linear transformation unit 2(323) has the state (312) at time t as an auxiliary input and has the value of the buffer (311) at time t as an input, and then outputs the value of the buffer (311) at time t+1. The linear transformation unit 2(323) includes a cyclic permutation on a word-by-word basis and three feedbacks. The feedback is processed on a word-by-word basis. The linear transformation unit 2(323) performs the following process:

Y(i)←B(i) (0≦i<20),
Y(2)←Y(2) XOR Y(4),
Y(5)←Y(5) XOR Y(8),
Y(9)←Y(9) XOR Y(16),
Y(M−1)←Y(M−1) XOR A(0),
W(i+1)←Y(i) (0≦i<19),
W(0)←Y(19)

The final results W(i) of the process are set in buffers B(i) at time t+1, respectively.

The configuration of the feedback "Y(p(i))←Y(p(i)) XOR Y(q(i))" is not limited to the above, but may be selected from combinations in which all values of p(i)–q(i) are different. Further, the same values as the words B(i1), B(i2), B(i3), B(i4), which are retrieved from the buffer (311) and input to the nonlinear transformation unit (321), may be taken as Y(p(i)), Y(q(i)) in the software implementation. In this case, it is possible to reduce the number of times the execution program of the data mixing unit (113) accesses the register (302). Thus, an increase of the program execution speed can be expected.

Figure 7:
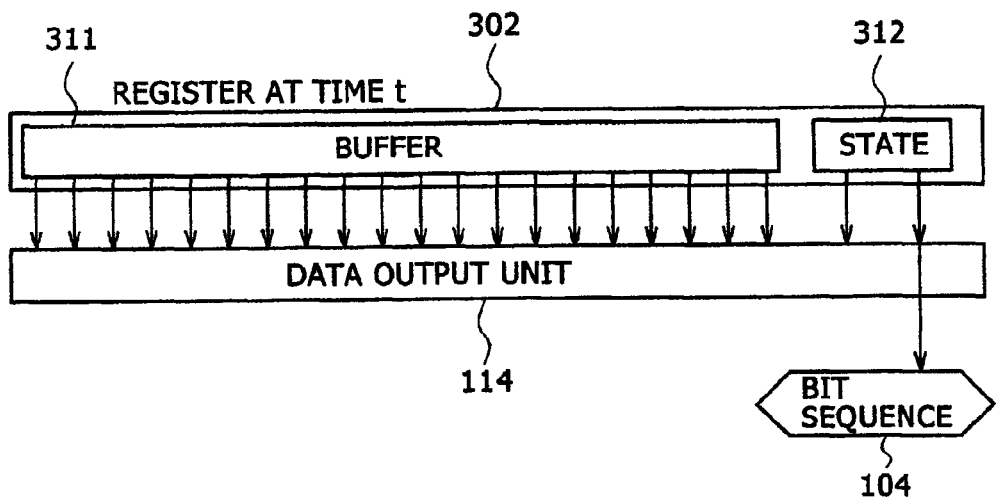
FIG. 7 is a schematic diagram showing a configuration of a random number output unit of the pseudorandom number generator.

FIG. 7 is a schematic diagram showing a configuration of the random number output unit (data output unit (114)) of the pseudorandom number generator (101) in the embodiment. The data output unit (114) outputs, as the random number bit sequence (104), a lower word A(1) of the state (312) from the value of the register (302) at time t.

Figure 8:
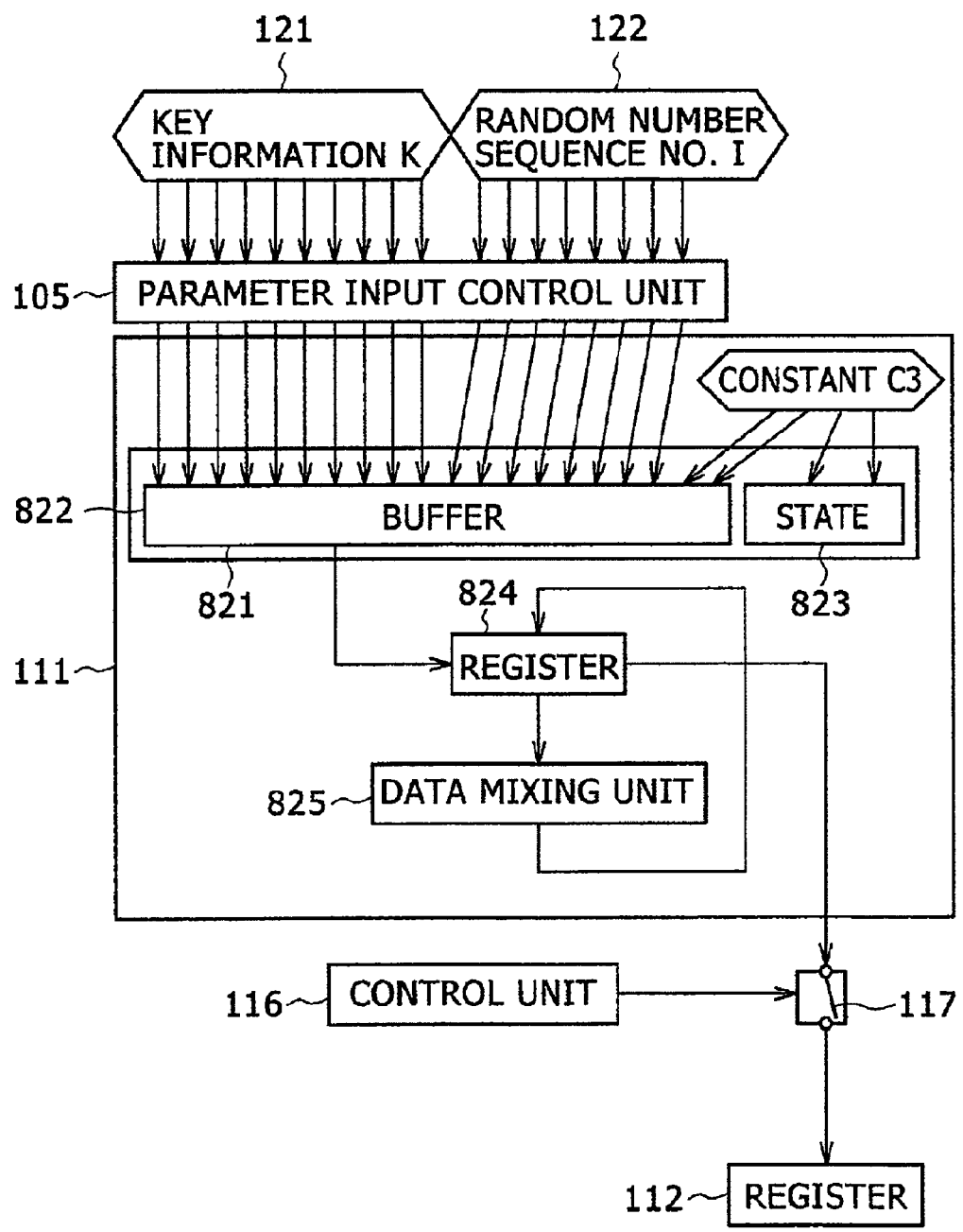
FIG. 8 is a schematic diagram showing a configuration of an initialization unit of the pseudorandom number generator.

FIG. 8 is a schematic diagram showing a configuration of the initialization unit (111) of the pseudorandom number generator (101) in the embodiment.

The key information K(121) of 80 bits (ten words) is denoted by K(0), K(1), and K(9) sequentially from the upper word. The random number sequence number I(122) of 64 bits (eight words) is denoted by I(0), I(1), and I(7) sequentially from the upper word. The initialization unit (111) receives the key information (121) and the random number sequence number (122) through the parameter input control unit (105), and sets the parameters into a register (824) according to the following process:

B(i)←K(i) (0≦i<10),
B(i)←I(i−10), (10≦i<16),
B(i)←C3(i−16), (16≦i<20),
A(0)←C3(4),
A(1)←C3(5)

Here, C3(i) (0≦i<6) is an arbitrary constant. Next, the values of the register are mixed by repeatedly using the data mixing unit (825). The data mixing unit (825) used here may be the data mixing unit (301) shown in FIG. 3. In this case, it is desired to repeat 40 times or more.

The initialization unit (111) performs the predetermined process, and sets the value of the register (824) into the register (112).

Figure 13:
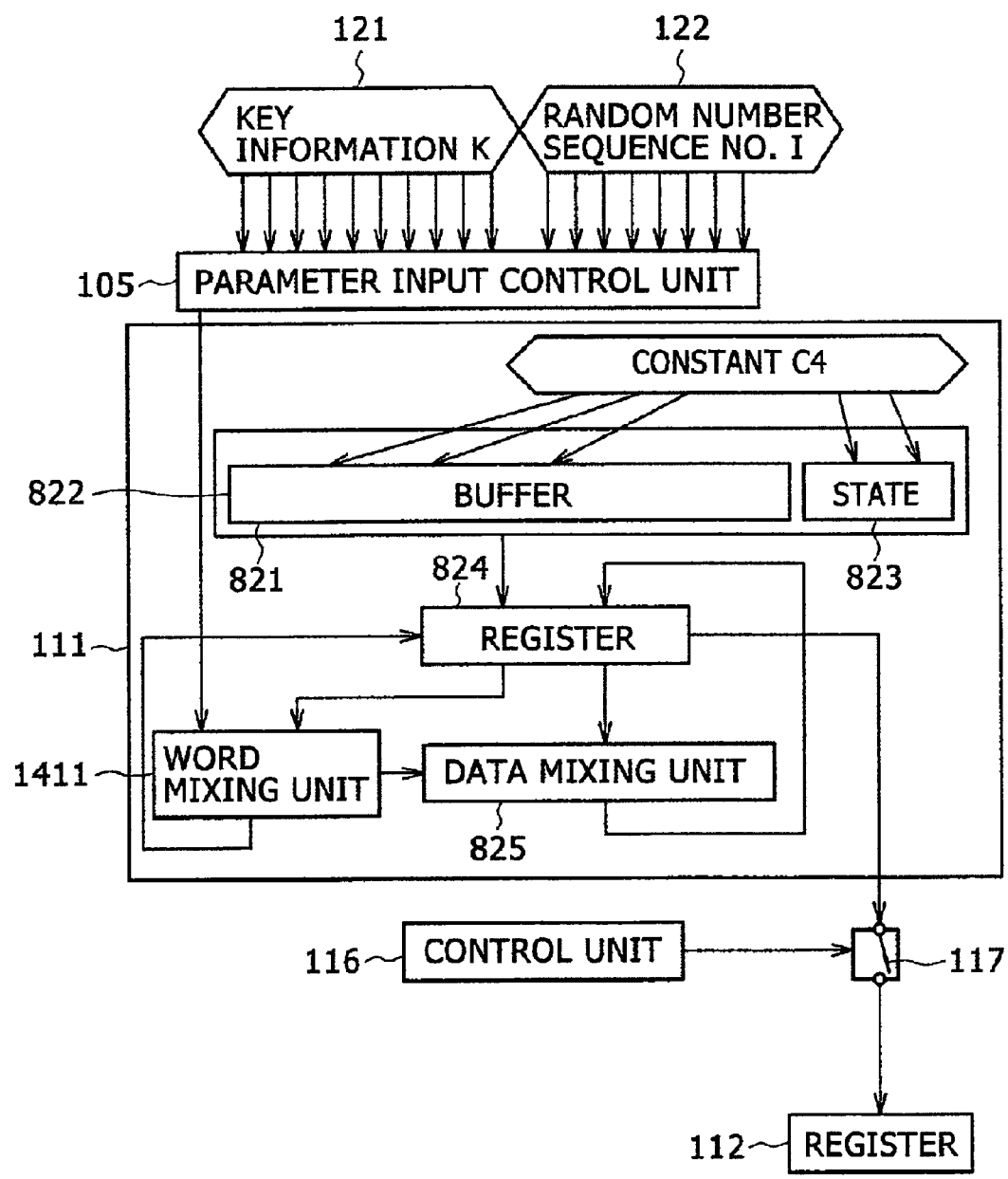
FIG. 13 is a schematic diagram showing another configuration of the initializing unit of the pseudorandom number generator.

FIG. 13 is a schematic diagram showing another configuration of the initialization unit (111) of the pseudorandom number generator (101) in the embodiment. The initialization unit (111) shown in FIG. 13 is configured such that a word mixing unit (1411) is added to the initialization unit (111) shown in FIG. 8. The key information K(121) of 80 bits (ten words) is denoted by K(0), K(1) . . . K(9) sequentially from the upper word. The random number sequence number I(122) of 64 bits (eight words) is denoted by I(0), I(1) . . . I(7) sequentially from the upper word. The initialization unit (111) first sets a constant C4 as the value of the register.

B(i)←C4(i), (0≦i<20),
A(i)←C4(i+20), (i=0, 1)

Here, C4(i) (0≦i<22) is an arbitrary constant. Next, the initialization unit (111) determines the initial state of the register (112) by mixing the data input through the parameter input control unit, according to the following steps:

Step 1: The parameter control unit (105) inputs the key information K(121) and random number sequence number I(122) sequentially, one word at a time, into the word mixing unit (1411).

Step 2: The word mixing unit (1411) takes the exclusive OR of one word of the data input from the parameter input control unit (105) and one word of the data stored in the register (824), and returns the calculation result to the original position of the register (824).

Step 3: The values of the register (824) are mixed using the data mixing unit (825).

Steps 1 to 3 are repeated until all the key information K(121) and random number sequence number I(122) are input to the parameter input control unit (105).

Step 4: The values of the register (824) are mixed repeatedly using the data mixing unit (825).

The data mixing unit (825) used here may be the data mixing unit (301) shown in FIG. 3. In Step 4, it is desired to repeat 20 times or more.

The initialization unit (111) performs the predetermined process, and sets the value of the register (824) into the register (112).

Next, a description will be given of how to select the parameter when the size of the key information K(121), n(K) bits, is equal to 128 bits. Also in the case of n(K)=128, the equipment configuration and the process procedure can be made in a similar manner to the case of n(K)=80. In the case of n(K)=128, the buffer (311) contains 32 words. The values of a buffer (822) are denoted by B(0), B(1), and B(19) sequentially from the upper word. The values of a state (823) are denoted by A(0), A(1) from the upper word.

Of the content in the register (302) at time t, the nonlinear transformation unit (321) inputs four words from the buffer (311) and outputs four words. The words retrieved from the buffer (311) are denoted by B(i1), B(i2), B(i3), B(i4) (i1<i2<i3<i4). In the case of n(K)=128, for example, i1=1, i2=5, i3=15, i4=29.

The linear transformation unit 2(323) includes a cyclic permutation on a word-by-word basis and three feedbacks.

The feedback is processed on a word-by-word basis. In the case of n(K)=128, for example, the linear transformation unit 2(323) performs the following process:

Y(i)←B(i) (0≦i<32),
Y(1)←Y(1) XOR Y(4),
Y(5)←Y(5) XOR Y(14),
Y(15)←Y(15) XOR Y(28),
Y(M−1)←Y(M−1) XOR A(0),
W(I+1)←Y(i) (0≦I<31),
W(0)←Y(31)

According to the embodiment described above, it is possible to reduce the linear transformation using the maximum distance separable code, and thereby to reduce the size of the pseudorandom number generator as a whole. It is also possible to minimize the state and the state update function while maintaining security.

Further, by performing the nonlinear transformation of the state, which is the core of security, separately from the process of the linear state update functions of the state and the buffer, the internal process of the nonlinear transformation can be made parallel. As a result, particularly in the hardware implementation, the time for processing the state update functions is reduced, so that a high-speed processing can be realized.

Figure 9:
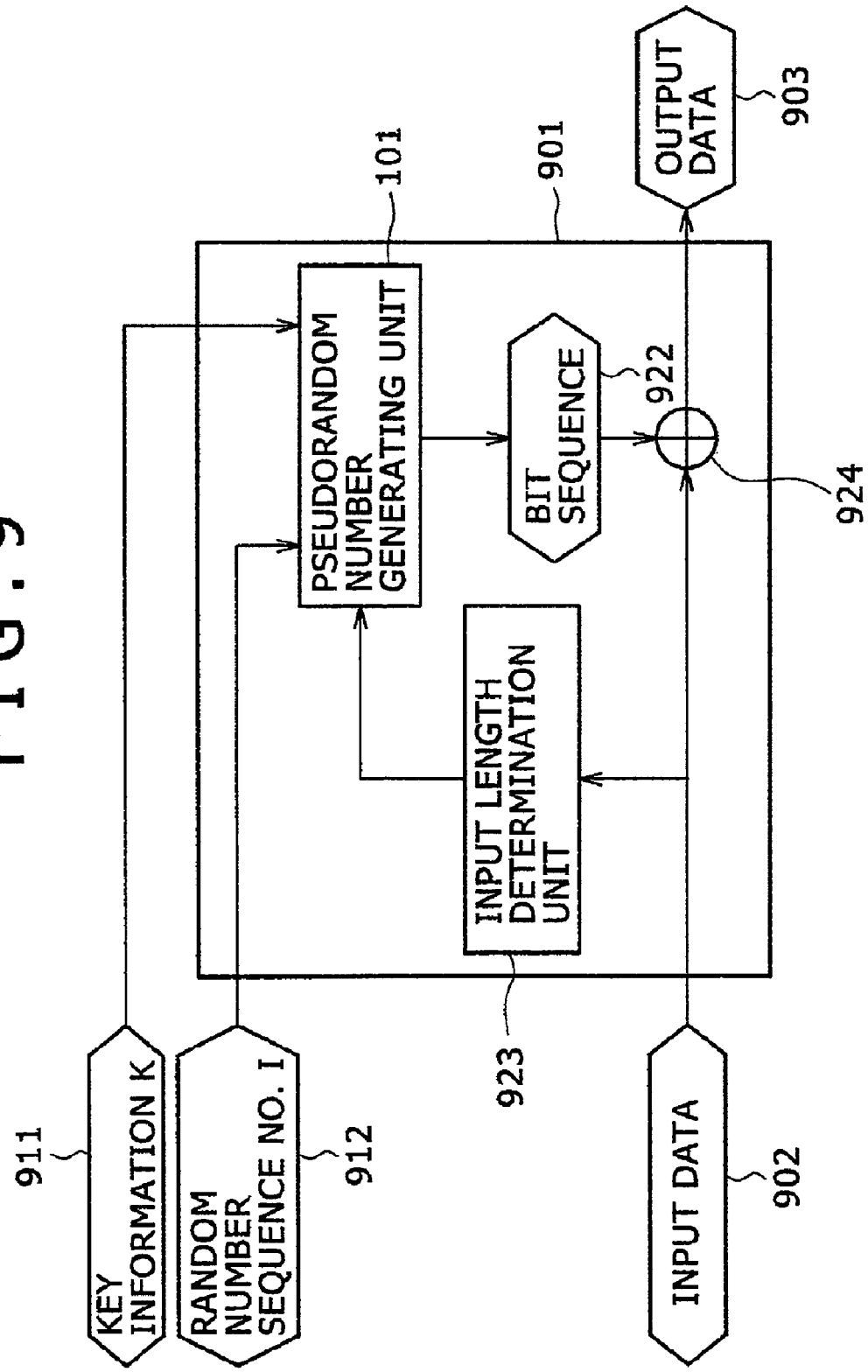
FIG. 9 is a schematic diagram showing a configuration of an encryption/decryption device for performing encryption/decryption using the pseudorandom number generator.

A preferred application example of the embodiment is, for example, a system in which a high-speed real-time processing, such as video replay, is necessary in small electronic devices such as mobile phones. Herein after, a description will be given of a data encryption using the embodiment and of a distribution system. FIG. 9 is a schematic diagram showing a configuration of an encryption/decryption device for performing encryption/decryption by the pseudorandom number generator (101) in the embodiment.

The encryption/decryption device (901) has the pseudorandom number generator (101) incorporated therein. When performing encryption, the encryption/decryption device (901) inputs key information (911), a random number sequence (912), and input data (902) to be encrypted, and outputs output data (903) as a ciphertext. The encryption/decryption device (901) also has an input length determination unit (923) for measuring the data length of the input data (902). In the encryption, the output data (903) is generated by an exclusive OR circuit (924) that performs an exclusive OR process between the input data (902) and a bit sequence (922) generated from the random number sequence number (912) through a pseudorandom number generator (101) for each bit, with the output of the input length determination unit (923) as the output length (123). In the encryption/decryption device (901) of FIG. 9, the encryption and the decryption are equivalent to each other. In the decryption, the decrypted text can be obtained as the output data (903) from the ciphertext given as the input data (902).

Figure 10:
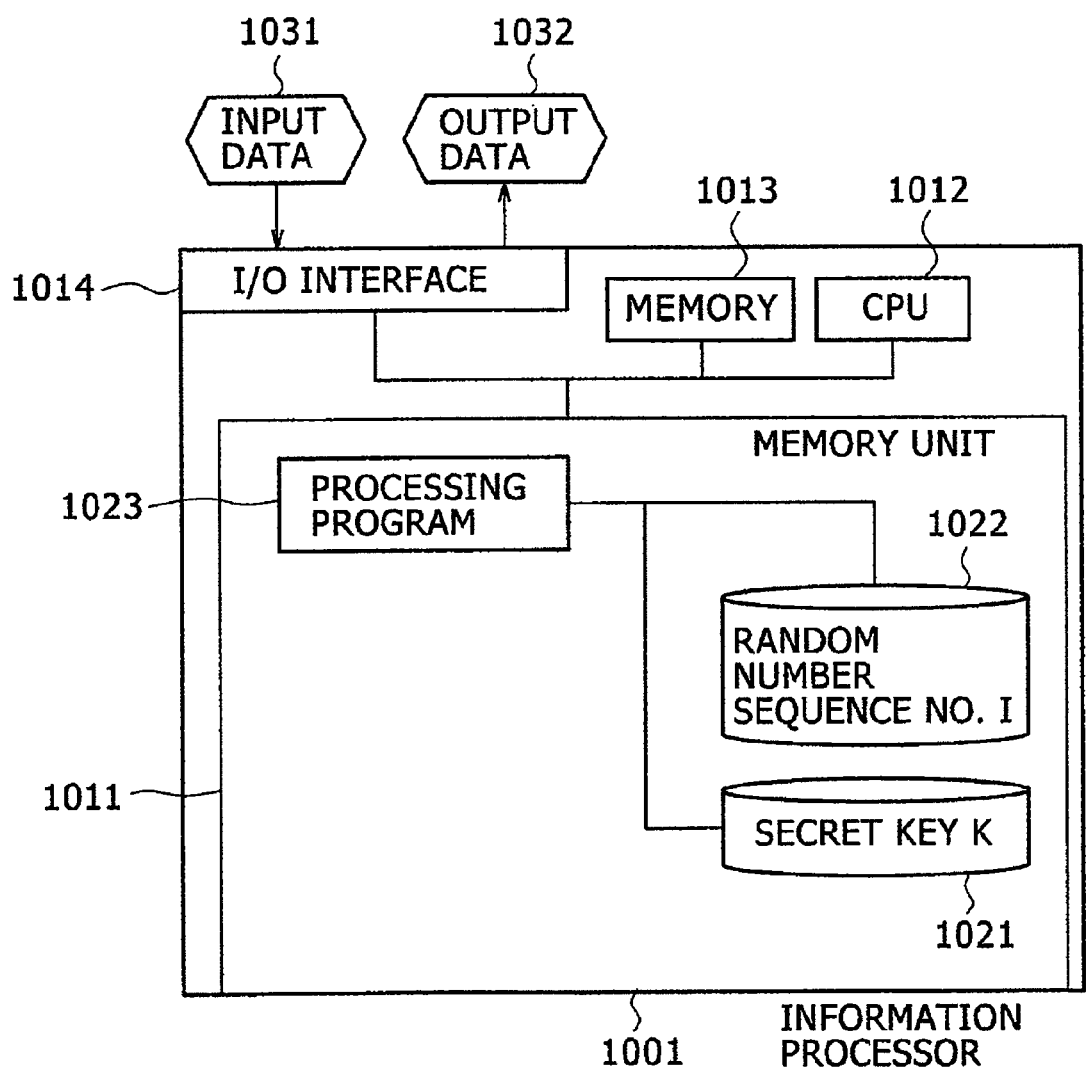
FIG. 10 is a schematic diagram showing an equipment configuration used when the respective units are realized by software.

FIG. 10 shows an example of the equipment configuration when the devices (101, 901) in the embodiment are implemented by software.

The devices (101, 901) can be configured on a general information processor (1001) in which a storage unit (1011), a CPU (1012), a memory (1013), and an input/output interface (1014) are connected via internal communication lines such as data buses.

In the pseudorandom number generator (101), a pseudorandom number generation program (1023) as a processing program (1023), a secret key (1021), and a random number sequence number (1022) are stored in the storage unit (1011). The pseudorandom number generator (101) is realized by the CPU (1012) executing the pseudorandom number generation program (1023).

Incidentally, the processing program (1023) may be stored in the storage unit (1011) in advance, or may be derived, when necessary, from another device to the storage unit (1011) through a medium that the input/output interface (1014) and the information processor (1001) can use. The medium includes, for example, a storage medium detachable from the input/output interface (1014), or a communication medium (namely, a network, or a carrier or digital signal propagated on the network).

The output length N(123), which is input data (1031) in the random number generation, is stored in the memory (1013) through the input/output interface (1014). The random number generation is performed by the CPU (1012) executing the pseudorandom number generation program (1023) to process according to the following steps:

Step 1: The pseudorandom number generation program (1023) is loaded into the memory (1013).

Step 2: The variable arrangement on the memory (1013) that realizes the register (112) in FIG. 1, is initialized using the secret key (1021) and the random number sequence number (1022).

Step 3: A data sequence is generated by repeating the data mixing process and the data output process on the CPU (1012).

The result of the random number generation is also stored in the memory (1013), and is output as output data (1032) through the input/output interface (1014).

Incidentally, in FIG. 10, the random number sequence number (1022) is assumed to be stored in the storage unit (1011) in advance, but may be given as the input data in a similar manner to the output length N(1031). The secret key (1021) may also be given as the input data.

In order to implement in the apparatus shown in FIG. 10 by software, the encryption/decryption device (901) according to the embodiment is configured as follows. That is, an encryption/decryption processing program, as the processing program (1023), is stored in the storage unit (1011). The secret key (1021) and the random number sequence number (1022) are stored in the storage unit (1011), similarly to the case of the pseudorandom number generator. The encryption/decryption device (901) is realized by the CPU (1012) executing the encryption/decryption processing program (1023).

In order to perform the encryption, the encryption/decryption processing program (1023) is loaded into the memory (1013) to perform a calculation on the CPU (1012). The input data (1031) of the encryption is stored in the memory (1013) through the input/output interface (1014). Similarly, the result of the encryption is stored in the memory (1013), and is output as the output data (1032) through the input/output interface (1014).

The random number sequence number (1022) may be stored in the storage unit (1011) in advance similarly to the case of the pseudorandom number generator, or may be given as the input data (1031). The secret key (1021) may also be given as the input data (1031).

Figure 11:
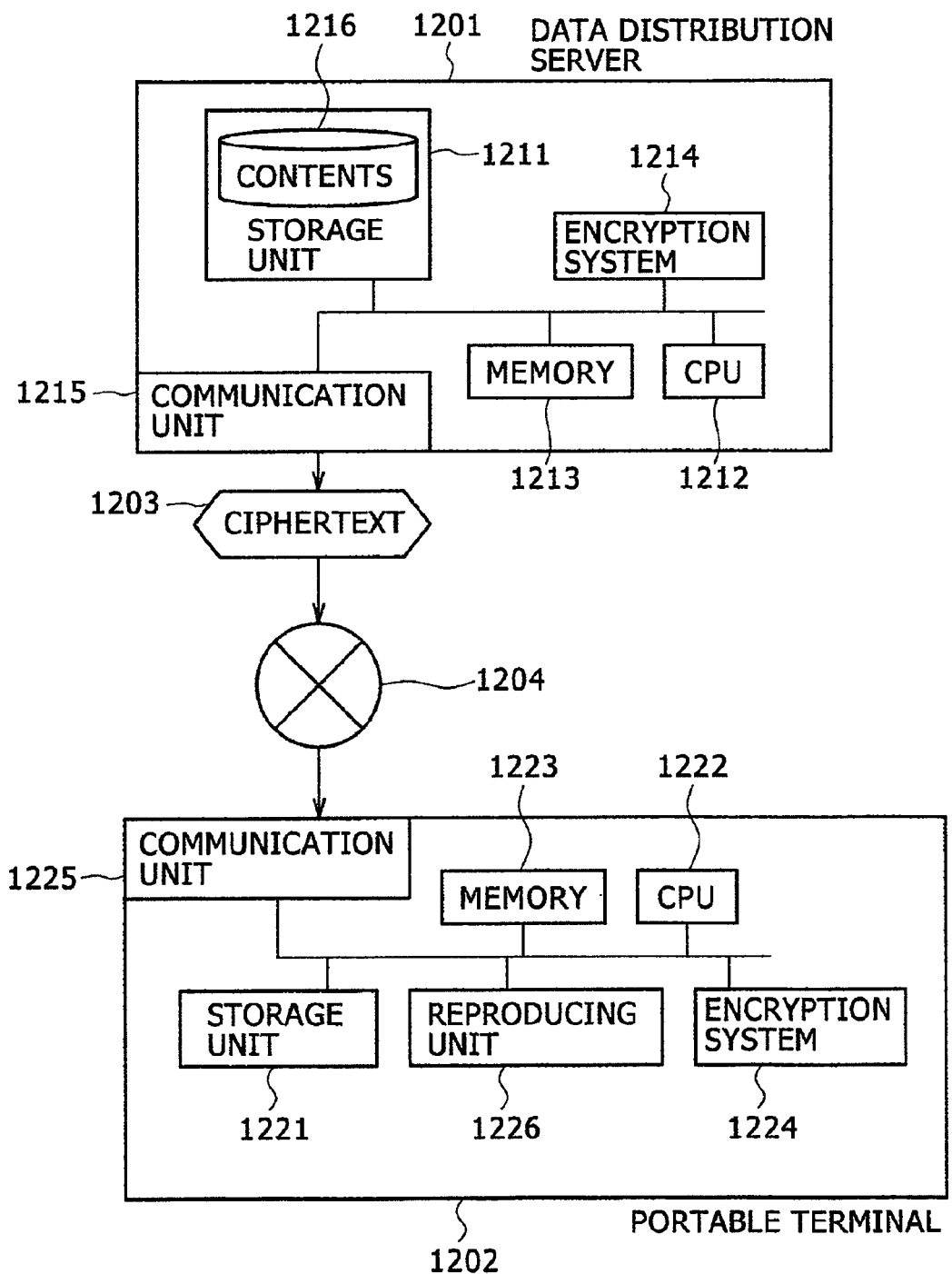
FIG. 11 is a schematic diagram showing a content distribution system to which the pseudorandom number generator is applied.

FIG. 11 shows a configuration example of a content distribution system.

The content distribution system includes a data distribution server (1201), a receiving terminal (1202), and a network (1204) which is a data transmission path. The content is subjected to encryption, and is distributed as a ciphertext (1203) from the data distribution server (1201) to the receiving terminal (1202). The network may be wired or wireless.

The data distribution server (1201) includes a storage unit (1211), a CPU (1212), a memory (1213), an encryption system (1214), and a communication unit (1215). The content (1216) is stored in the storage unit (1211). The receiving terminal (1102) includes a storage unit (1221), a CPU (1222), a memory (1223), an encryption system (1224), and a content reproducing unit (1226).

The data distribution is performed according to the following steps.

Step 1: The data distribution server (1201) and the receiving terminal (1202) secretly share the key information K(121) in advance so as to be able to share the same random number sequence. They also share, but not necessarily secretly, the random number sequence number (122). In order to share such information, for example, it is possible to use a key distribution method using the public key encryption technology.

Step 2: The data distribution server (1201) encrypts the content (1216) by the encryption system (1214) provided with the shared information.

Step 3: The data distribution server (1201) transmits the ciphertext data (1203) to the receiving terminal (1202) by the communication unit (1215) through the network (1204).

Step 4: The receiving terminal (1202) decrypts the ciphertext data (1203) received through a communication unit (1225) by the encryption/decryption system (1224) provided with the shared information.

Step 5: The receiving terminal (1202) reproduces the decrypted content by the reproducing unit (1226).

In the communication method described above, the random number sequence number (122) is shared before the communication is started. However, the random number sequence number (122) may be attached to the ciphertext (1203) and transmitted to the receiving terminal (1202) during the communication. In this case, it is possible to prevent degradation of security due to data alteration on the communication path by adding a message authentication code to the communication data including the random number sequence number (122).

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A pseudorandom number generator comprising:
 a state storage unit of a capacity of two blocks (one block is n bits);
 a buffer of a capacity of a plurality of blocks;
 a nonlinear transformation unit for receiving stored content in the buffer in response to a clock input, and outputting data of the same size as the received data;
 a first linear transformation unit for receiving content of the state storage unit as well as the output from the nonlinear transformation unit, and storing an output into the state storage unit;
 a second linear transformation unit for receiving the stored content in the buffer as well as the stored content in the state storage unit in response to the clock input, and storing an output into the buffer; and
 an output unit for outputting the stored content of the state storage unit as a random number sequence,
 wherein the nonlinear transformation unit includes a nonlinear substitution unit for receiving 1 block and outputting 1 block, to perform the following process:
 $X(1) \leftarrow S1[B(i1)]$,
 $X(2) \leftarrow S2[B(i2)]$,
 $X(3) \leftarrow S3[B(i3)]$,
 $X(4) \leftarrow S4[B(i4)]$,
 wherein B(i) represents the i-th block of the buffer, X(i) represents the output block of the nonlinear transformation unit, Sj[W] represents the substitution operation by the nonlinear substitution unit, and the arrow represents the substitution of data, respectively,
 wherein the first linear transformation unit receives 2 blocks data A(0), A(1) output from the state storage unit and 4 blocks data X(1), X(2), X(3), X(4) output from the nonlinear transformation unit, and outputs 2 blocks data R(0), R(1),
 wherein the first linear transformation unit includes a small linear transformation unit which receives 2 blocks data P(0), P(1), performs $(Q(0), Q(1) \leftarrow L(P(0), P(1)))$, and outputs 2 blocks data Q(0), Q(1),
 wherein the first linear transformation unit further performs the following operations:
 $P(0) \leftarrow A(0) \text{ XOR } X(1)$,
 $P(1) \leftarrow A(1) \text{ XOR } X(2)$,
 $R(0) \leftarrow Q(0) \text{ XOR } X(3)$,
 $R(1) \leftarrow Q(1) \text{ XOR } X(4)$,
 wherein A(i) represents the i-th block output from the state storage unit, X(i) represents the i-th block output from the nonlinear transformation unit R(i) represents the output block from the first linear transformation unit, L represents an operation by the small linear transformation unit L, the arrow represents the substitution of data, P(i) represents the i-th block input into the small linear transformation unit L, and Q(i) represents the i-th block output by the small linear transformation unit L.

2. The pseudorandom number generator according to claim 1, further comprising an initialization unit for receiving a secret key of n(K) bits to determine an initial state of the buffer,
 wherein the capacity of the plurality of blocks of the buffer is at least two times the capacity of n(K) bits.

3. The pseudorandom number generator according to claim 1,
 wherein the values of i2-i1, i3-i2, and i4-i3 are different from each other.

4. The pseudorandom number generator according to claim 3,
 wherein the value of i4-i1 is further different from any of the values of i2-i1, i3-i2, and i4-i3.

5. The pseudorandom number generator according to claim 3,
 wherein the second linear transformation unit performs the following process:
 $Y(i) \leftarrow B(i) (0 \leq i < M)$,
 $Y(j1) \leftarrow Y(j1) \text{ XOR } Y(k1)$,
 $Y(j2) \leftarrow Y(j2) \text{ XOR } Y(k2)$,
 $Y(j3) \leftarrow Y(j3) \text{ XOR } Y(k3)$,
 $Y(M-1) \leftarrow Y(M-1) \text{ XOR } A(0)$,
 $W(i+1) \leftarrow Y(i) (0 \leq i < M-1)$,
 $W(0) \leftarrow Y(M-1)$
 wherein A(0) represents the upper block of the state storage unit, B(i) represents the i-th block of the buffer, M represents the number of blocks forming the buffer, W(i) represents the output of the second linear transformation unit, XOR represents the exclusive OR operation on a word-by-word basis, and the arrow represents the substitution of data, respectively, where
 $i1 \leq j1 < k1 < i2 \leq j2 < k2 < i3 \leq j3 < k3 < i4$.

6. The pseudorandom number generator according to claim 5,
 wherein the exclusive OR operation is defined by the parameters j1, j2, j3, k1, k2, and k3 where the values of k1-j1, k2-j2, k3-j3 are different from each other.

7. The pseudorandom number generator according to claim 1, wherein the small linear transformation unit further includes multiplier defined over finite field, to perform the following operation as the operation (Q(0), Q(1)) ←L(P(0), P(1)) according to claim 1:
wherein P(i) represents the i-th block input into the small linear transformation unit, Q(i) represents the i-th block output from the small linear transformation unit, Ci represents a constant other than zero for one block size, and one of C1 and C2 represents a constant other than one, mul(x, y) represents the multiplication process by the multiplier, and the arrow represents the substitution of data, respectively.

8. The pseudorandom number generator according to claim 2,
wherein the initialization unit receives a random number sequence number as an external input together with the secret key, divides the external input into data blocks on a word-by-word basis, inputs the divided data blocks into the buffer sequentially from an upper word, and sets a predetermined constant into lower words of the buffer where the external input is not input and into the state storage unit.

9. The pseudorandom number generator according to claim 8,
wherein the initialization unit further takes the exclusive OR of data of each of the divided data blocks and a specific word of the buffer to update the value of the buffer, and operates the nonlinear transformation unit, the first linear transformation unit, and the second linear transformation unit to update internal states of the buffer and the state storage unit.

10. The pseudorandom number generator according to claim 1,
wherein the output unit outputs one lower word of the state storage unit as a partial random number sequence.

11. An encryption/decryption device comprising:
a pseudorandom number generator; and
an exclusive OR device,
wherein the pseudorandom number generator includes:
a state storage unit of a capacity of 2 blocks (1 block is n bits);
a buffer of a capacity of a plurality of blocks;
an initialization unit for dividing a secret key and a random number sequence number into data blocks on a word-by-word basis, receiving the divided data blocks into the buffer sequentially from an upper word, and setting a predetermined constant into lower words of the buffer and into the state storage unit;
a nonlinear transformation unit for receiving stored content in the buffer in response to a clock input, and outputting data of the same size as the received data;
a first linear transformation unit for receiving content of the state storage unit as well as the output from the nonlinear transformation unit, and storing an output into the state storage unit;
a second linear transformation unit for receiving the stored content in the buffer as well as the stored content in the state storage unit in response to the clock input, and storing an output into the buffer; and
an output unit for outputting the data in the state storage unit,
wherein the exclusive OR device performs the exclusive OR operation of the data sequence and the output data from the output unit for each bit,
wherein the nonlinear transformation unit includes a nonlinear substitution unit for receiving block and outputting 1 block, to be following process:

$X(1) \leftarrow S1[B(i1)]$,
$X(2) \leftarrow S2[B(i2)]$,
$X(3) \leftarrow S3[B(i3)]$,
$X(4) \leftarrow S4[B(i4)]$,
wherein B(i) represents the i-th block of the buffer, X(i) represents the output block of the nonlinear transformation unit, Sj[W] represents the substitution operation by the nonlinear substitution unit, and the arrow represents the substitution of data, respectively,
wherein the first linear transformation unit receives 2 blocks data A(0), A(1) output from the state storage unit and 4 blocks data X(1), X(2), X(3), X(4) output from the nonlinear transformation unit, and outputs 2 blocks data R(0), R(1),
wherein the first linear transformation unit includes a small linear transformation unit which receives 2 blocks data P(0), P(1), performs (Q(0), Q(1))←L(P(0), P(1)), and outputs 2 blocks data Q(0), Q(1),
wherein the first linear transformation unit further performs the following operations:
$P(0) \leftarrow A(0) \text{ XOR } X(1)$,
$P(1) \leftarrow A(1) \text{ XOR } X(2)$,
$R(0) \leftarrow Q(0) \text{ XOR } X(3)$,
$R(1) \leftarrow Q(1) \text{ XOR } X(4)$,
wherein A(i) represents the i-th block output from the state storage unit, X(i) represents the i-th block output from the nonlinear transformation unit, R(i) represents the output block from the first linear transformation unit, L represents an operation by the small linear transformation unit L, the arrow represents the substitution of data, P(i) represents the i-th block input into the small linear transformation unit L, and Q(i) represents the i-th block output by the small linear transformation unit L.

12. A data distribution system comprising:
a server and
a terminal device coupled with the server via a network, the data distribution system;
wherein the server comprises
a first pseudorandom number generator;
a storage unit; and
an encryption device,
wherein the first pseudorandom number generator has:
a first state storage unit of a capacity of 2 blocks (1 block is n bits);
a first buffer of a capacity of a plurality of blocks;
a first initialization unit for dividing a secret key and a random number sequence number into data blocks on a word-by-word basis, inputting the divided data blocks into the buffer sequentially from an upper word, and setting a predetermined constant into lower words of the buffer and into the state storage unit;
a first nonlinear transformation unit for inputting stored content of the first buffer in response to a first clock input, and outputting data of the same size as the input data;
a first linear transformation unit for inputting content of the first state storage unit as well as the output of the first nonlinear transformation unit, and storing an output into the first state storage unit;
a second linear transformation unit for inputting the stored content the first buffer as well as the stored content of the first state storage unit in response to the first clock input, and storing an output into the first buffer; and
a first output unit for outputting the data of the first state storage unit,
wherein the storage unit stores the content data, wherein the encryption device encrypts the content data by calculating exclusive OR of the content data and the output data from the first output unit for each bit and outputs the encrypted content data, wherein the terminal device comprises a second pseudorandom number generator; and a decryption device, wherein the second pseudorandom number generator has:

a second state storage unit of a capacity of 2 blocks, which is connected to the server through the network;

a second buffer of a capacity of a plurality of blocks;

a second initialization unit for dividing the secret key and the random number sequence number, both of which are shared with the server, into data blocks on a word-by-word basis, inputting the divided data blocks into the buffer sequentially from an upper word, and setting a predetermined constant into lower words of the buffer and into the state storage unit;

a second nonlinear transformation unit for inputting stored content of the second buffer in response to a second clock input, and outputting data of the same size as the input data;

a third linear transformation unit for inputting content of the second state storage unit as well as the output of the second nonlinear transformation unit, and storing an output into the second state storage unit;

a fourth linear transformation unit for inputting the stored content of the second buffer as well as the stored content of the second state storage unit in response to the second clock input, and storing an output into the second buffer; and a second output unit for outputting the data of the second state storage unit, wherein the decryption device decrypts the encrypted content data by calculating exclusive OR of the encrypted content data received from the server through the network, and the output data from the second output unit for each bit.

* * * * *